US007117274B2

(12) United States Patent
Avery et al.

(10) Patent No.: US 7,117,274 B2
(45) Date of Patent: Oct. 3, 2006

(54) GRAPHICAL USER INTERFACE AND APPROACH THEREFOR

(75) Inventors: Daniel Lee Avery, Chandler, AZ (US);
Michael J. Smith, Chandler, AZ (US);
Joel Patrick Bailey, Chandler, AZ (US); Jerry Schumacher, Gilbert, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 449 days.

(21) Appl. No.: 10/794,991

(22) Filed: Mar. 5, 2004

(65) Prior Publication Data

US 2005/0197798 A1 Sep. 8, 2005

(51) Int. Cl.
*G01R 31/28* (2006.01)

(52) U.S. Cl. ............................ 710/19; 714/43; 714/738

(58) Field of Classification Search ............ 710/15–19, 710/72, 316–317; 714/28–33, 37–46, 727, 714/732–742; 715/700
See application file for complete search history.

(56) References Cited

U.S. PATENT DOCUMENTS

| | | | | | |
|---|---|---|---|---|---|
| 5,428,770 | A | * | 6/1995 | Garner | 714/733 |
| 5,634,002 | A | * | 5/1997 | Polk et al. | 714/38 |
| 5,819,025 | A | * | 10/1998 | Williams | 714/30 |
| 5,892,949 | A | * | 4/1999 | Noble | 717/125 |
| 5,896,495 | A | * | 4/1999 | Stein et al. | 714/38 |
| 6,425,101 | B1 | * | 7/2002 | Garreau | 714/727 |
| 6,556,223 | B1 | * | 4/2003 | Tran et al. | 715/804 |
| 6,681,351 | B1 | * | 1/2004 | Kittross et al. | 714/724 |
| 2002/0186245 | A1 | * | 12/2002 | Chandhoke et al. | 345/764 |

* cited by examiner

*Primary Examiner*—Christopher Shin
(74) *Attorney, Agent, or Firm*—Peter Zawilski

(57) ABSTRACT

A circuit testing and control approach involves configurable switch control for automatically detecting and routing test signals along a plurality of test circuit paths. According to an example embodiment of the present invention, graphical user interface (GUI) (240) includes stored computer-executable code that, when executed, causes a micro-computer circuit to send configuration signals to a microcontroller (220). A configurable circuit (215) coupled to the microcontroller is then configured by the microcontroller, in response to the configuration signals, for routing test signals using controllable switches. In one implementation, the configurable circuit includes circuits on inter-connectable circuit boards (210, 250, 260), with sense nodes for detecting the presence of an inter-connectable circuit board coupled to another. In response to the detected presence (or lack thereof), the controllable switches control the routing of the test signals between the inter-connectable circuit boards. The configuration signals are used for one or more of actively controlling the microcontroller, programming the microcontroller (e.g., storing program code therein) or requesting data from the microcontroller. With these approaches, automatic switching of test signal paths, on an individual circuit and in connection with other circuits, is achieved without necessarily physically accessing the configurable circuit.

25 Claims, 8 Drawing Sheets

GRAPHICAL USER INTERFACE AND APPROACH THEREFOR

FIELD OF THE INVENTION

The present invention relates generally to testing circuits and, more particularly, to circuit testing methods and arrangements such as used in connection with IEEE JTAG (Joint Test Access Group) standards.

BACKGROUND

The electronics industry continues to rely upon advances in semiconductor technology to realize higher-functioning devices in more compact areas. For many applications, realizing higher-functioning devices requires integrating a large number of electronic devices into a single silicon wafer. As the number of electronic devices per given area of the silicon wafer increases, manufacturing and testing processes become more difficult.

A wide variety of techniques have been used in electronic circuits and devices to ensure that, once they are manufactured, they operate fully in compliance with their intended design and implementation specifications. Many of the more complex circuit designs include circuits that permit in-circuit testing via circuit access pins. The IEEE 1149.1 JTAG recommendation, for example, provides test circuit architecture for use inside such circuits. This architecture includes a test access port (TAP) controller coupled to the circuit pins for providing access to and for controlling various standard features designed into such circuits. Some of these features are internal scan, boundary scan, built-in test and emulation.

For a variety of implementations, different circuit paths are tested using the JTAG recommendation, depending upon the type of test being performed. Mechanical connections (i.e., jumpers) have typically been used to select such a desired circuit path for JTAG-type testing. Setting mechanical connections, however, typically requires access to the connections being set. For example, circuit modules (e.g., permanent and/or reusable blocks and integrated circuits (ICs)) can be stacked on top of one another, such that in setting jumpers the circuit modules muist be pulled apart. If mistakes are made in setting the jumpers, the process of pulling apart the modules and setting the jumpers must be repeated. The implementation of this mechanical connection-setting, approach has been challenging. For example, taking apart modules for making connections involves a risk of damaging the connectors, boards and/or other circuitry involved therewith.

Current JTAG and other circuit testing approaches have typically been limited to the testing of powered circuits. For instance, typical diagnostic testing involves the passage of test signals after power-up of the circuit being tested, with the test signals passing through circuits during the operation thereof. Therefore, JTAG and other circuit testing approaches typically have not been used for testing circuits prior to power-up.

In addition, for many chip designs, customized chips are made by describing their functionality using a hardware-description language (HDL), such as Verilog or VHDL. The hardware description is often written to characterize the design in terms of a set of functional macros. The design is computer simulated to ensure that the custom design criteria are satisfied. For highly-complex custom chip designs, the above process can be burdensome and costly. The highly integrated structure of such chips leads to unexpected problems, such as signal timing, noise-coupling and signal-level issues. Consequently, such complex custom chip designs involve extensive validation. This validation is generally performed at different stages using a Verilog or VHDL simulator. Once validated at this level, the Verilog or VHDL HDL code is synthesized, for example, using "Synopsis," to a netlist that is supplied to an ASIC (Application Specific Integrated Circuit) foundry for prototype fabrication. The ASIC prototype is then tested in silicon. Even after such validation with the Verilog or VHDL simulator, unexpected problems are typical. Overcoming these problems involves more iterations of the above process, with testing and validation at both the simulation and prototype stages. Such repetition significantly increases the design time and cost to such a degree that this practice is often intolerable in today's time-sensitive market.

These and other difficulties present challenges to the design and testing for a variety of applications.

SUMMARY

Various aspects of the present invention involve testing approaches for a variety of integrated circuits, such as those including memory circuits and others. The present invention is exemplified in a number of implementations and applications, some of which are summarized below.

According to one example embodiment of the present invention, a graphical user interface (GUI) arrangement includes computer-executable code that, when executed, causes the GUI (e.g., using a micro-computer) to send configuration data to a programmable microcontroller. The configuration data is executed at the microcontroller for routing test signals via a selected circuit path on a configurable circuit using automatically set switches.

In one implementation, the GUI sends active configuration data, wherein the microcontroller responds to directly route test signals on the configurable circuit when the configuration data is received. User inputs at the GUI (i.e., from an input device such as a keyboard or pointing device) are used for executing the computer-executable code to effect the active configuration. For instance, using a display of a configurable circuit on a computer screen, a user at the GUI can point and click on a controllable switch on the display. In response, the computer-executable code is executed to cause the GUI to send control information to the microcontroller, which in turn configures the switch accordingly (i.e., sets it open or closed).

In another implementation, the configuration data sent by the GUI is stored at the microcontroller for execution at a later time (i.e., during a subsequent power-up of the microcontroller). For example, user inputs at the GUI, such as for selecting a particular initialization program, are used to execute the computer-executable code to cause the GUI to send the particular initialization program to the microcontroller. The initialization program is stored in memory, such as flash memory, at the microcontroller and used for configuring the configurable circuit.

In other implementations, control characteristics such as the routing of clock signals and the detection of circuit characteristics such as configuration status are sent to the microcontroller using the stored computer-executable code. In the instance where circuit characteristics are detected, those detected characteristics are sent back to the GUI for display.

In another example embodiment of the present invention, memory storage media includes computer-executable code for execution by a computer, such that upon execution, the computer-executable code causes the computer to send configuration data to a microcontroller for controlling routing circuitry. The routing circuitry includes controllable switches for selectively routing test signals, such as JTAG test signals, between test signal circuitry and a target circuit device. Characteristics of the routing circuitry detected at the microcontroller are sent to the computer where they are displayed.

In another example embodiment of the present invention, one or more of the approaches discussed above are used with a prototype arrangement including a plurality of inter-connectable circuit boards. Each inter-connectable circuit board includes a microcontroller, a plurality of circuit paths and controllable switches adapted for routing test data between at least one of the circuit paths and a target circuit. A GUI is adapted to send configuration data to at least one of the microcontrollers for automatically configuring the microcontroller to control the controllable switches. Test signals are selectively routed between the inter-connectable circuit boards in response to the configuration data. For example, when input/output nodes connect two inter-connectable circuit boards, the configuration data causes the microcontroller to detect the connection and, in response, set the controllable switches for routing test data between the inter-connectable circuit boards.

The above summary of the present invention is not intended to describe each embodiment or every implementation of the present invention. The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
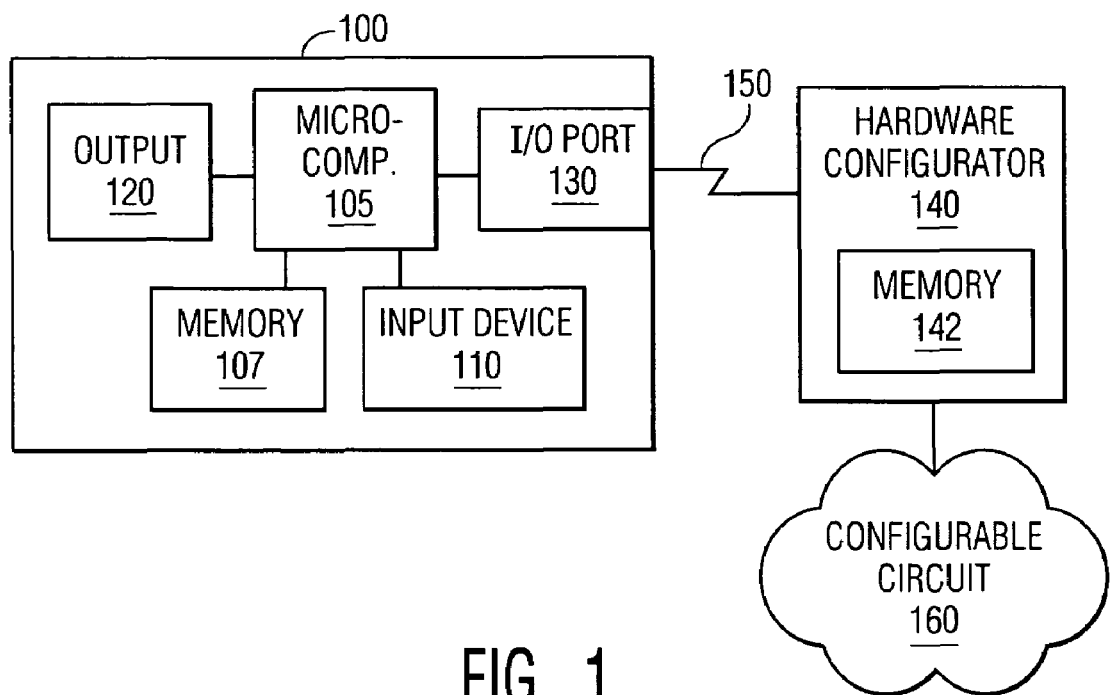
FIG. 1 is a graphical user interface GUI device adapted for communicating with and controlling a configurator server arrangement, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

The present invention is believed to be applicable to a variety of circuits and approaches involving and/or benefiting from testing, and in particular to testing involving approaches such as JTAG and digital signal testing (i.e., using digital signal protocols) and the configuration thereof. While the present invention is not necessarily limited to such applications, an appreciation of various aspects of the invention is best gained through a discussion of examples in such an environment.

According to an example embodiment of the present invention, a graphical user interface (GUI) arrangement is adapted for receiving user inputs and, in response to the user inputs, to send control and/or program signals to a hardware configurator for controlling the routing of test signals in a configurable circuit. The hardware configurator (e.g., including a programmable microcontroller) is coupled to dedicated test signal routing circuitry that includes configurable switches and sets the configurable switches in response to the control and/or program signals. The lest signal routing circuitry then routes test signals to target circuits that are to be tested.

In one implementation, the GUI is adapted for actively controlling the hardware configurator. For instance, user inputs received at the GUI can be used to generate control signals that are sent to the hardware configurator and used to set one or more of the configurable switches. Other user inputs can be used to control one or more of monitoring, testing, and diagnosing of the target circuits, the hardware configurator and/or the test signal routing circuitry. With these approaches, users at the GUI can actively control a variety of functions, including the switching of test signal routing paths.

In another implementation, the GUI is adapted for receiving program inputs from a user and sending programming data to the hardware configurator in response to the program inputs. The programming data is stored for subsequent use in configuring the hardware configurator. For instance, the hardware configurator can be programmed for controlling the routing of test signals, reporting circuit characteristics, controlling testing operations, and performing diagnostics. With this approach, the hardware configurator can be programmed and reprogrammed for implementing the hardware configurator for a variety of testing approaches and also with a variety of circuits.

In another example embodiment, the GUI is adapted to program the configurator arrangement, in response to user inputs, to monitor signals in the configurable circuit and to automatically switch the configurable switches in response to the monitored signals. Test signals are then delivered to and/or from target circuitry that is on the configurable circuit and/or coupled to the configurable circuit (e.g., on a separate circuit board) at the input/output node. For example, by monitoring an input/output node of the configurable circuit, the presence of another circuit coupled to the input/output node can be detected. Switches can then be correspondingly set to either route signals to and/or from the input/output node when another circuit is present or to remove the input/output node from the test signal routing circuitry when no other circuit is detected. With these approaches, physical routing (i.e., the switching of jumper wires) is not necessary for delivering test signals to different circuits, and switches on the configurable circuit are remotely controllable with the GUI.

In another example embodiment of the present invention, the GUI discussed above is adapted for communicating with a hardware configurator that is part of a reusable inter-connectable testing circuit including one or more devices, such as I/O, memory, DSP, power supply and RISC CPU devices. The inter-connectable testing circuit is also adapted for coupling to other circuits, for example, for arranging prototype circuit designs and architectures for testing purposes. The inter-connectable testing circuits couple at input/output pins for passing signals including testing signals therebetween. When testing such a prototype arrangement, testing signals need to be coupled to various elements, circuit paths and/or other inter-connectable testing circuits. In this regard, the GUI is adapted for controlling and/or programming the hardware configurator to control test signal routing switches on at least one particular inter-connectable testing circuit for routing test signals. With this approach, the routing of the test signals is effected remotely and/or automatically, without necessarily requiring physical access to the inter-connectable testing circuit. This approach has also been found useful in implementations where the inter-connectable circuits are coupled in a stacked prototype arrangement (i.e., where access to the circuits is limited).

In another example embodiment of the present invention, a prototyping approach involves the use of a plurality of interchangeable circuits, each interchangeable circuit having a microcontroller and a switch that route test data and are controllable with a user interface terminal coupled to the microcontroller. The user interface terminal is programmed to respond to user inputs by sending configuration data to the microcontroller. The microcontroller and switch may, for example, include one or more of the microcontroller/switch arrangements discussed herein.

Each interchangeable circuit includes test data input (TDI) and test data output (TDO) nodes, with data being routed through test circuit paths in the interchangeable circuit under the control of the microcontroller, as controlled and/or programmed by the user interface terminal. Also on each interchangeable circuit is a communications port for coupling to a user interface, either directly or through other interchangeable circuits, for inputting control signals for the microcontroller (e.g., for storing programming instructions and/or manually controlling a switch arrangement). Each of the interchangeable circuits is coupled to one or more programmable circuits, devices and/or functional blocks used for emulating a particular circuit design. For instance, circuit devices such as an FPGA (field-programmable gate array) device, an FPGA plug-in board, an expansion board and/or an external circuit communicatively coupled to the interchangeable circuit are used in various instances. These approaches have been found useful, for example, for circuit board development and as a support tool for silicon-on-chip platforms. The interchangeable circuits may be implemented, for example, in a manner such as discussed in U.S. application Ser. No. 10/016,731, entitled "Method and Arrangement for Rapid Silicon Prototyping" and filed on Dec. 11, 2001, which is a continuation of U.S. Pat. No. 6,347,395 (VLSI.206PA), entitled "Method and Arrangement for Rapid Silicon Prototyping" and filed on Dec. 18, 1998, both of which are fully incorporated herein by reference.

FIG. 1 shows a graphical user interface (GUI) 100 for controlling a hardware configurator arrangement 140, according to another example embodiment of the present invention. The control of the hardware configurator arrangement 140 may, for instance, include active control, initialization and/or reconfiguring of the hardware configurator. The GUI 100 includes an input device 110 and an output device 120 coupled to a micro-computer 105, which is also coupled to a memory 107 and an input/output (I/O) port 130. The hardware configurator 140 includes a memory 142 and is coupled to the I/O port 130 by a communications link 150. The hardware configurator 140 is adapted for configuring a configurable circuit arrangement 160, which includes test signal routing paths with controllable switches therein for coupling test signals between dedicated test-signal circuitry and a target circuit device. The input device 110 may include, for example, a keyboard, a pointing device or a touch screen (e.g., implemented in connection with the output device 120). The output device 120 may include, for example, a display screen, a printer or an indicator light.

The memory 107 stores computer-executable code (e.g., an application program written in C++) that, when executed, causes the micro-computer 105 to send one or both of active and programming configuration data to the hardware configurator 140. For instance, upon initialization, an initialization file stored in the memory 107 is read by the micro-computer 105, with values in the initialization file being used by the micro-computer to configure the hardware configurator 140. The path of the initialization file used is displayed at the output device 120 for browsing by a user (e.g., for use in selecting a particular initialization file to be used).

In another example, when a user inputs active control signals at the input device 110, the computer-executable code is executed to cause the micro-computer 105 to send a signal to the hardware configurator that in turn causes the hardware configurator to configure the configurable circuit 160. Similarly, when a user inputs program control signals at the input device 10, the computer-executable code is executed to cause the micro-computer 105 to send programming data to the hardware configurator 140 for storage in the memory 142. The stored programming data is then subsequently used to program the hardware configurator 140 and control the operation thereof when executed.

In one implementation, the computer-executable code stored in the memory 107, when executed, causes the micro-computer 105 to send programming information to the hardware configurator 140 for automatically detecting JTAG test signals in the configurable circuit 160. One or more of JTAG-type TDI (test data in) and TDO (test data out) signals from various input pins on the configurable circuit 160 are coupled to connectors on the hardware configurator 140 and monitored using interrupts. Each of the signals is tied to a specific interrupt of the hardware configurator 140, with the hardware configurator being programmed with an interrupt routine for each of the signals via the programming information sent by the micro-computer 105. When the interrupt occurs, the programmed hardware configurator 140 routes the proper path for the particular type of signal (i.e., as directed by the IEEE 1149.1 JTAG recommendation discussed above) using the controllable switches. In various other implementations, other signals such as Test Clock (TCK) signals, Test Mode Select (TMS) and boundary-scan signals are also passed on and/or to and from the configurable circuit 160.

In response to receiving data from the hardware configurator 140 via the I/O port 130, the computer-executable code stored at the memory 107 further causes the micro-computer 105 to receive the data and display information regarding the received data at the output device 120. Data received from the hardware configurator 140 may include, for example, data regarding the configuration of controllable switches, clock frequencies and voltages in the configurable circuit 160. The displayed data may include one or more representations (e.g., graphs, charts, and circuit schematics) that convey the received data to a user.

In another example embodiment, the computer-executable code stored in the memory 107 causes the micro-computer 105 is to display at the output device 120 a schematic representing test signal routing circuitry in the configurable circuit 160. The schematic shows controllable switches in the configurable circuit 160, as well as their status (i.e., open, closed). The displayed schematic is used to select a test signal circuit path and set switches in order to pass test signals along the selected test signal circuit path. In response to user inputs regarding the selection of the displayed switches, the computer-executable code stored in the memory 107 causes the micro-computer 105 to send configuration data to the hardware configurator 140 for setting controllable switches in the configurable circuit 160.

A schematic representing target circuits in the configurable circuit 160 is displayed at the output device 120 using the computer-executable code stored in the memory 107, according to another example embodiment. The displayed schematic is used to select a target circuit to which test signals are to be routed. In response to input data representing the target circuit selection, the computer-executable code stored in the memory 107 causes the micro-computer 105 to send configuration data to the hardware configurator 140 for setting controllable switches in the configurator circuit 160. The hardware configurator 140 then sets controllable switches in the configurable circuit 160 to route test data to the selected target circuit.

The GUI 100 is further adapted for controlling the coupling of a variety of signal types to target circuitry in the configurable circuit 160 in connection with another example embodiments of the present invention. For instance, clocks having different frequency can be coupled to selected target circuitry using a switching arrangement, in response to inputs received at the input device 110 and used for executing computer-executable code in the memory 107. In one implementation, the GUI 100 is adapted for receiving a user input for selecting a particular clock frequency for a particular target circuit. In response, the computer-executable code causes the micro-computer 105 to send configuration data to the hardware configurator 140 for setting controllable switches to couple the proper clock signal to the particular target circuit.

In one particular instance, the GUI 100 is part of a personal computer having a plurality of communication ports, including I/O port 130. The computer-executable code in the memory 107 causes the micro-computer 105 to configure one or the communication ports for communication with the hardware configurator 140. A communications link (e.g., an RS232 link, a USB link or an Internet link) is coupled between the configured communication port and the hardware configurator 140 for downloading configuration data, such as initialization program data, thereto.

Figure 2:
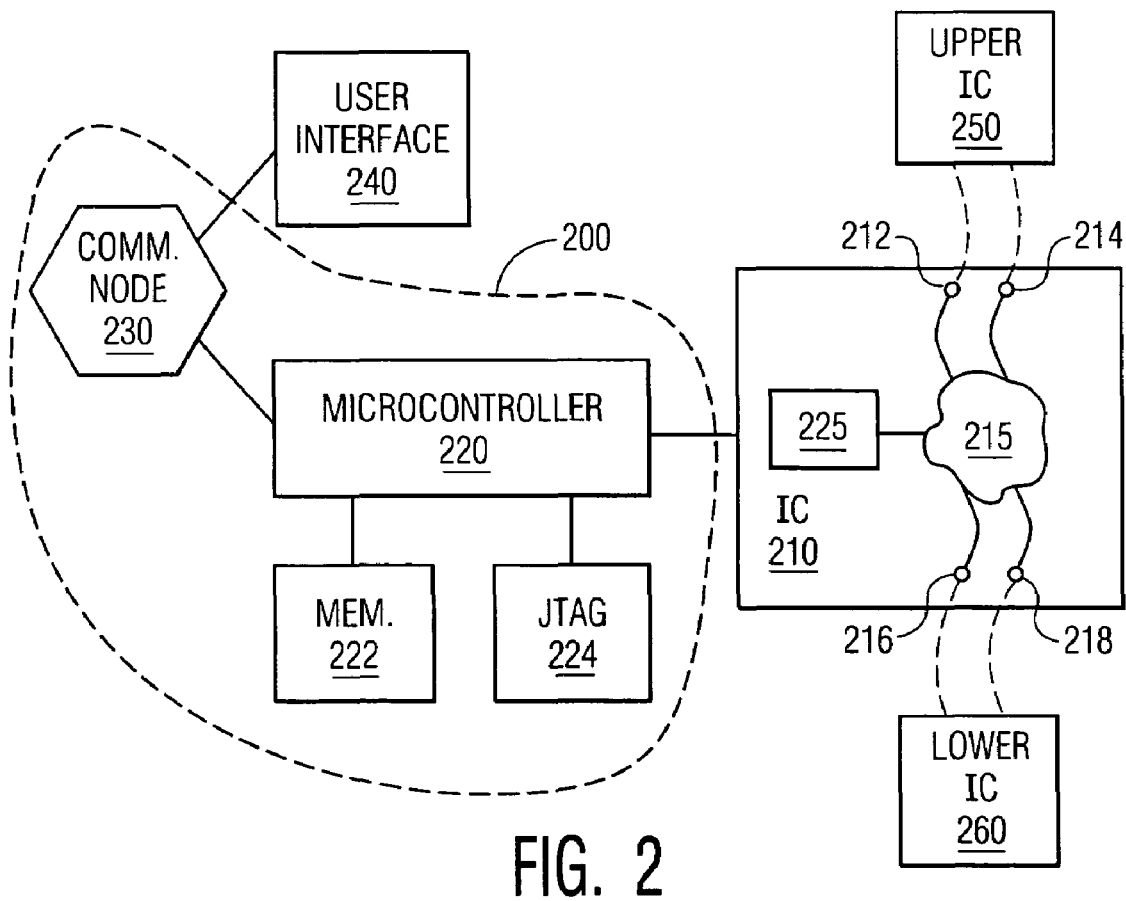
FIG. 2 is a circuit arrangement including a GUI adapted for controlling the hardware configuration of an integrated circuit, according to an example embodiment of the present invention.

FIG. 2 shows a configurator system 200 including a GUI 240 for monitoring and controlling an integrated circuit (IC) 210, according to another example embodiment of the present invention. The configurator system 200 further includes a microcontroller 220 coupled between the IC 210 and the GUI 240, and communications node 230 coupled between the GUI and the microcontroller. A memory 222 and a JTAG controller 224 are also coupled to the microcontroller 220 and respectively used for storing JTAG program information and controlling JTAG signals for the IC 210, in response to inputs received through the communications node 230.

User inputs at the GUI 240 are sent through the communications node 230 to the microcontroller 220 where they can be stored at the memory 222 and/or immediately used for execution, for example, using the JTAG controller 224 to control JTAG operations in the IC 210. JTAG signal path switches 215 on the IC 210 route data within the IC (i.e., to a target circuit 225) and/or to and from circuits coupled to the IC, as further discussed below. These JTAG signal path switches 215 are manually switchable using the GUI 240 and automatically switchable using programmed information sent from the GUI 240 and stored at the memory 222. ID one implementation, general-purpose input output (GPIO) controls, located in the microcontroller 220 and/or coupled to the microcontroller are used for controlling the JTAG signal path switches 215. For general information regarding ICs and JTAG-type approaches, and for specific information regarding approaches to automatic switching for JTAG routing that may implemented in connection with the present invention, reference may be made to U.S. Provisional Patent Application Ser. No. 60/452,095 (US030051P/VLSI.379P1), filed on Mar. 4, 2003, entitled "Testing Circuit and Approach Therefor" and fully incorporated herein by reference.

In one implementation, the IC 210 is coupled to one or more other similar ICs. For example, upper input and output pins 212 and 214, respectively, can be coupled to an upper IC 250 for communicating JTAG test signals. Test signals from the upper IC 250 are routed to the IC 210 through input pin 212, passed through JTAG test paths on the IC 210 and routed back to the upper IC through output pin 214. In this example, the communications node 230 is coupled to the GUI 240 by way of a communications node on the upper IC 250. Optionally, the communications node is coupled directly to the GUI 240, with the communications node on the upper IC being coupled directly and/or though the communications node 230 to the GUI 240. The routing of the JTAG test signals is accomplished using the JTAG signal path switches 215 on the IC 210, as discussed above, using control inputs from the GUI 240 and/or program data sent from the GUI 240 and stored at the memory 222. For instance, a user at the GUI 240 can issue a command that cuts off signals to and/or from the upper IC 250, or otherwise control the routing of JTAG signals on the IC 210 between the IC 210 and other circuits. In another instance, a user at the GUI 240 sends program data for storage at the memory 222. The microcontroller 220 is also optionally adapted for controlling JTAG signal path switches on the upper IC 250, using the JTAG controller 224 and routing control signals through input and/or output pins 212 and 214.

In another example, a lower IC 260 is coupled to the IC 210 at lower output and input pins 216 and 218, respectively, using an approach similar to that discussed above in connection with the upper IC 250. The lower IC 260 is also coupled to the GUI 240, either by way of a communications node on the lower IC or through the communications node on the IC 220. In one instance, both the upper and lower ICs 250 and 260 are respectively coupled to the IC 210. Inputs received at upper input pin 212 are routed through JTAG signal paths on the IC 210 and out the lower output pin 216 to the lower IC 260 using the JTAG signal path switches 215. Outputs from the lower IC 260, responsive to the JTAG signals received from the output pin 216, are routed to the input pin 218 and, using the JTAG signal path switches 215, back to the upper IC 250 by way of output pin 214. Responses to the JTAG signals from one or all of the ICs 210, 250 and 260 can be routed to the GUI 240.

The microcontroller 220 is implemented for monitoring the IC 210 during both operational and non-operational modes thereof. Data regarding monitored circuits in the IC 210 is sent through the communications node 230 to the GUI 240, where users can monitor aspects of the IC 210. In addition to the monitoring of JTAG signals and responses as discussed above, a variety of characteristics of the IC 210 can be monitored using the microcontroller 220. For instance, prior to power-up of the IC 210, characteristics of the IC 210 are tested for diagnostics or other purposes. Proper connectivity between circuit modules (e.g., JTAG modules) and other ICs coupled to IC 210, as well as the operation of the IC 210 can thus be tested before use of the IC. In other instances, characteristics such as clock frequencies (e.g., using timers) and voltages of the IC 210 (e.g., using an analog-to-digital converter (ADC)) are monitored with the microcontroller 220. These characteristics can then be passed through the communications node 230 a user at the GUI 240.

Various ones of the elements shown in FIG. 2 are implemented using a variety of approaches, for example, depending upon the available equipment, type of signals being passed and desired functionality. For instances, the GUI 240 includes one or more of a variety of graphical and non-graphical GUIs that facilitate two-way communication between the GUI and the microcontroller 220. A variety of user input devices, such as keyboards, pointing devices and touch screens may thus be implemented in connection with the GUI 240. Similarly, the communications node 230 may include one or more of a variety of communications links, such as a USB link, an RS232 link, wireless and/or wired links and others. Also, a variety of types of memory may be used in addition to or as the memory 222, such as flash and/or SRAM memory. Communications between these and other components in the configurator system 200 are also optionally effected using a bus controller in the IC 210, such as a I2C bus controller, to which the microcontroller 220, memory 222, JTAG controller 224 and communications node 230 can be coupled.

Figure 3:
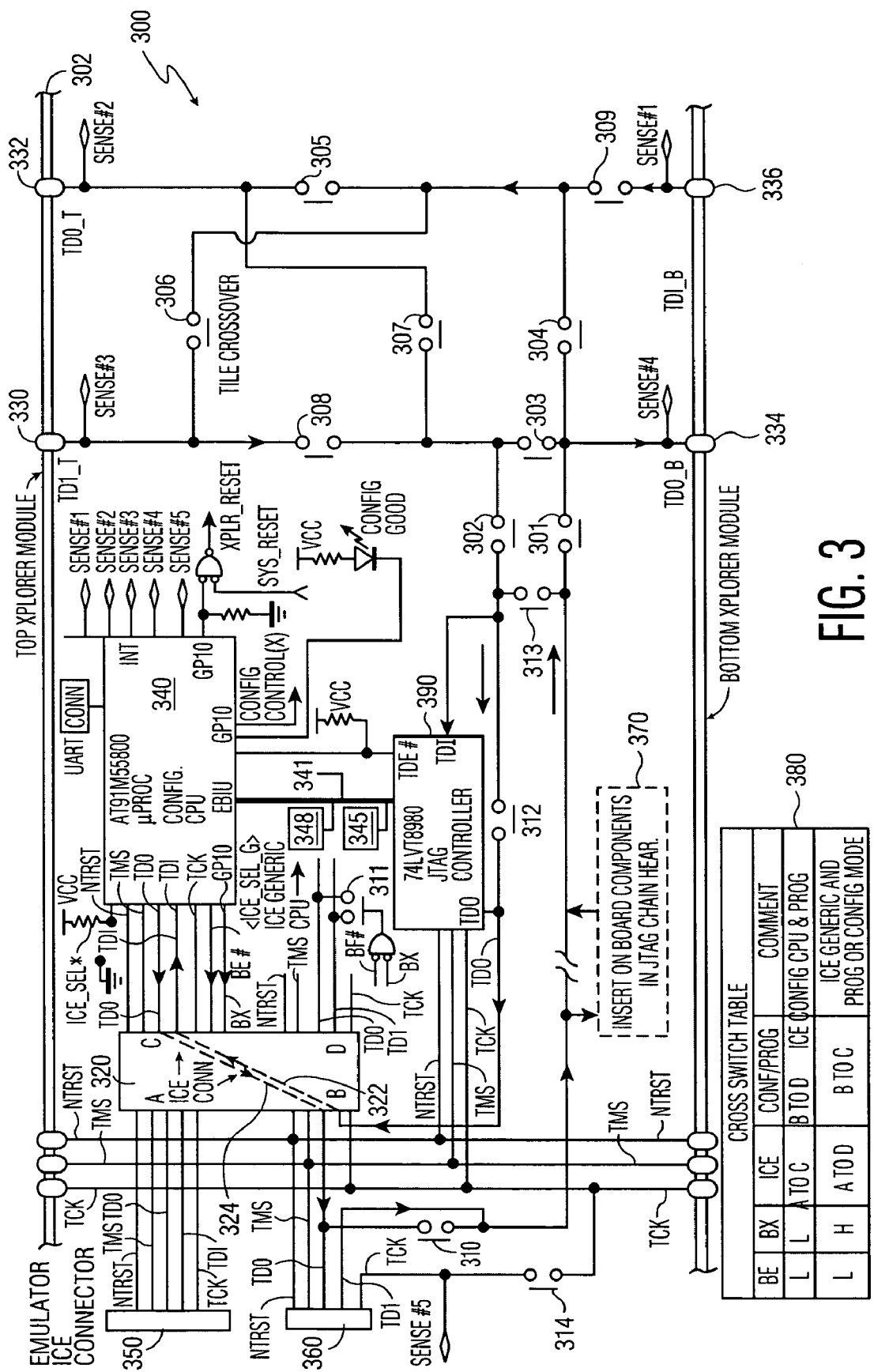
FIG. 3 is a circuit arrangement programmed using a GUI for routing test signals in response to user-input controls received through a communications port, according to another example embodiment of the present invention.

FIG. 3 is a circuit 300 including a central processing unit (CPU) 340 (e.g., a microcontroller) coupled to test nodes 330, 332, 334 and 336 and controllable by a GUI, according to another example embodiment of the present invention. By way of example, the control and configuration of the circuit 300 is discussed in the context of the GUI 100 shown in FIG. 1; however, the circuit 300 is applicable for implementation in connection with a variety of GUIs, including GUI 100. The CPU 340 is programmed with software for responding to an initialization routine and for running interrupt (alternatively, data-polling) routines for monitoring test data. The programming software is stored, for example, in a flash memory accessible by the CPU 340. For instance, a flash memory 345 coupled to an external bus interface unit (EBIU) 341 may store the programming software, which may include computer-executable code sent to the flash memory 345 by the GUI 100. A communications link 348 is also coupled to the EBIU 341 and used for communicating between the CPU 340 and a GUI 100. Control signals, programming software and other signals are sent to the circuit 300 through the communications link 348, and monitored characteristics of the circuit 300 are also sent from the circuit 300 by way of the communications link to the GUI 100. In response to monitored test data, the CPU 340 is operated to control a plurality of switches 301–314 for routing test signals on the circuit 300 and to/from additional circuits coupled, for example, to one of the test nodes 330, 332, 334 and/or 336.

Test nodes 330 and 332 are TDI and TDO nodes, respectively, that are adapted for coupling to another circuit (e.g., a similar circuit stacked over the circuit 300). Test nodes 334 and 336 are TDI and TDO nodes, respectively, that are adapted for coupling to another circuit (e.g., a similar circuit stacked below the circuit 300). Test signals such as TCK, TMS, TDI and TDO are passed to one or more JTAG-compatible circuits 370 (e.g., CPUs or FPGAs). In addition, in the instance where one or more pairs of the test nodes 330, 332, 334 and 336 is coupled to another circuit, the test signals are passed to and from the other circuit.

The CPU 340 is coupled to a connector 320 by way of a first node C and to other circuitry and devices in the circuit 300. Node A at the connector 320 is coupled to an in-circuit emulator (ICE) connector 350, node B of the connector is coupled to both a program connector 360 and an on-circuit JTAG controller 390 and node D of the connector is optionally coupled to another CPU. The ICE connector 350 is adapted for coupling to an ICE, such as the "Majic" multi-processor advanced JTAG interface controller available from Embedded Performance, Inc. of Milpitas, Calif. Signals are applied to ICE connector 350 for emulation, such as in connections with the ARM 946ES RISC processor available from Arm, Inc. having a location in Redmond, Wash. The GUI 100 is adapted to send configuration data for emulation, for example, using the NAPA (Nexperia Advanced Prototyping Architecture) emulation platform available from Philips Semiconductors of Sunnyvale, Calif. The program connector 360 is adapted for coupling to a JTAG signal source, such as a tester or another stackable circuit, similar to the circuit 300, for supplying test signals to the circuit 300. The on-circuit JTAG controller 390 is also coupled to the CPU 340 by way of the EBIU 341 for communications therebetween.

The CPU 340 is adapted to be interrupted by test activity at the TDI and TDO nodes 330, 332, 334 and 336, with each node being tied to one or more interrupt input ports of the CPU. The particular node at which test data is detected informs CPU 340 for controlling the switches 301–314 for routing the data to a particular test circuit path, as indicated by the particular (interrupting) node. For example, as discussed below, a variety of circuit paths on the circuit 300 as well as between the circuit 300 and other circuits can be selected using the switches 301–314.

Using the CPU 340, the switches 301–314 are controlled for coupling test inputs from one or more of a plurality of sources to JTAG-compatible circuits 370 and for routing data to and from JTAG-compatible components. In one instance, JTAG test inputs are coupled to the circuit 300 from an external tester, such as an ICE coupled to ICE connector 350, a JTAG program device coupled to program connector 360 or from another circuit. Inputs and outputs from adjacent circuits are coupled to the test nodes 330 and 332, and/or the test nodes 334 and 336, for various implementations. In another instance, JTAG testing is carried out on the circuit 300 using the on-circuit JTAG controller 390.

For example, when the CPU 340 detects a signal at the program connector 360, switch 310 is controlled (open) so that a TDI signal from the program connector 360 is sent to the JTAG-compatible circuits 370. In addition, switch 314 is closed to couple a TCK signal from the program connector 360 to the circuit 300. When no signal is detected at the program connector 360 (or when connection to the program connector is not desired), switch 310 is controlled (closed) to couple a test signal from node B of the connector 320 to the JTAG-compatible circuits 370. Switch 314 is also correspondingly opened such that a TCK signal from the program connector 360 is not coupled to the circuit 300.

In another example, when the CPU 340 detects a signal at the input nodes 330 and 332, a test input signal from node 330 is coupled to one or more of the JTAG-compatible circuits 370 with the closing of switches 308, 302 and 312. Switches 313 and 303 are set open, and an output from the JTAG-compatible circuits 370 is coupled for output from the circuit 300 (e.g., through test node 332, with switches 304 and 305 also being closed and with switch 309 being open). This approach may be implemented, for instance, using either computer-executable code or control inputs received from a GUI at the communications link 348.

In another example, a GUI coupled to the communications link 348 controls the CPU 340 to set switches on the circuit 300 such that a signal is provided to the TDO node 334 and monitors TDI node 336. When a signal is detected at TDI node 336, the CPU 340 sets switches 304 and 303 open and switch 309 closed for routing output test data from the circuit 300 to a circuit coupled to test nodes 334 and 336.

In another example embodiment, the on-circuit JTAG controller 390 is implemented for a stand-alone JTAG test implementation, for instance, controlled by a GUI coupled to the communications link 348. In this example, switches 310 and 313 are closed and at least switches 312, 314, 301 and 302 are opened. With this approach, signals from the on-circuit JTAG controller 390 are routed to the JTAG-compatible circuits 370, with an output therefrom being routed back to the JTAG controller 390.

In one particular implementation, and referring again to FIG. 3, two circuit boards (upper and lower) containing IEEE 1149.1 JTAG compatible devices, similar to the circuit 300 shown in FIG. 3, are stacked together. Fur instance, such an arrangement may be implemented in a manner similar to that discussed in connection with upper IC 150 and lower IC 160 in FIG. 1. The following discussion is directed to the upper and lower boards having elements similar to those shown in FIG. 3, with corresponding discussion of the elements in FIG. 3 for both of the upper and lower boards having an upper or lower indicator in brackets. For instance, each of the upper and lower boards include node 330, with node 330 on the upper board being designated as "node 330 (upper board)" and node 330 at the lower board being designated as "node 330 (lower board)."

The upper one of the circuit boards is coupled to a JTAG programmer plugged into a program connector 360 (upper board). A TDI signal is sent out to the lower board at node 334 (upper board) and received at the lower board through a node 330 (lower board). The upper circuit board monitors a TDI node 336 (upper board) and detects a signal returning from the lower board through a TDO node 332 (lower board). In response to the detected signal, the CPU recognizes that the lower board is coupled to the upper board at nodes 334 (upper board) and 336 (upper board) and accordingly sets the switches (i.e., switch 309 is set closed and switch 304 is set open).

FIGS. 4–9 show several approaches that may be implemented in connection with circuits discussed herein, such as those discussed above in connection with FIG. 1 (e.g., the GUI is implemented for programming and/or directly controlling the hardware configurator using these approaches). Various ones of these approaches are separately applicable in connection with different example embodiments of the present invention. In addition, these approaches may be implemented together, with operation of a configurator that follows the approach shown in the figures; the discussion of FIGS. 4–9 below follows this approach.

Figure 4:
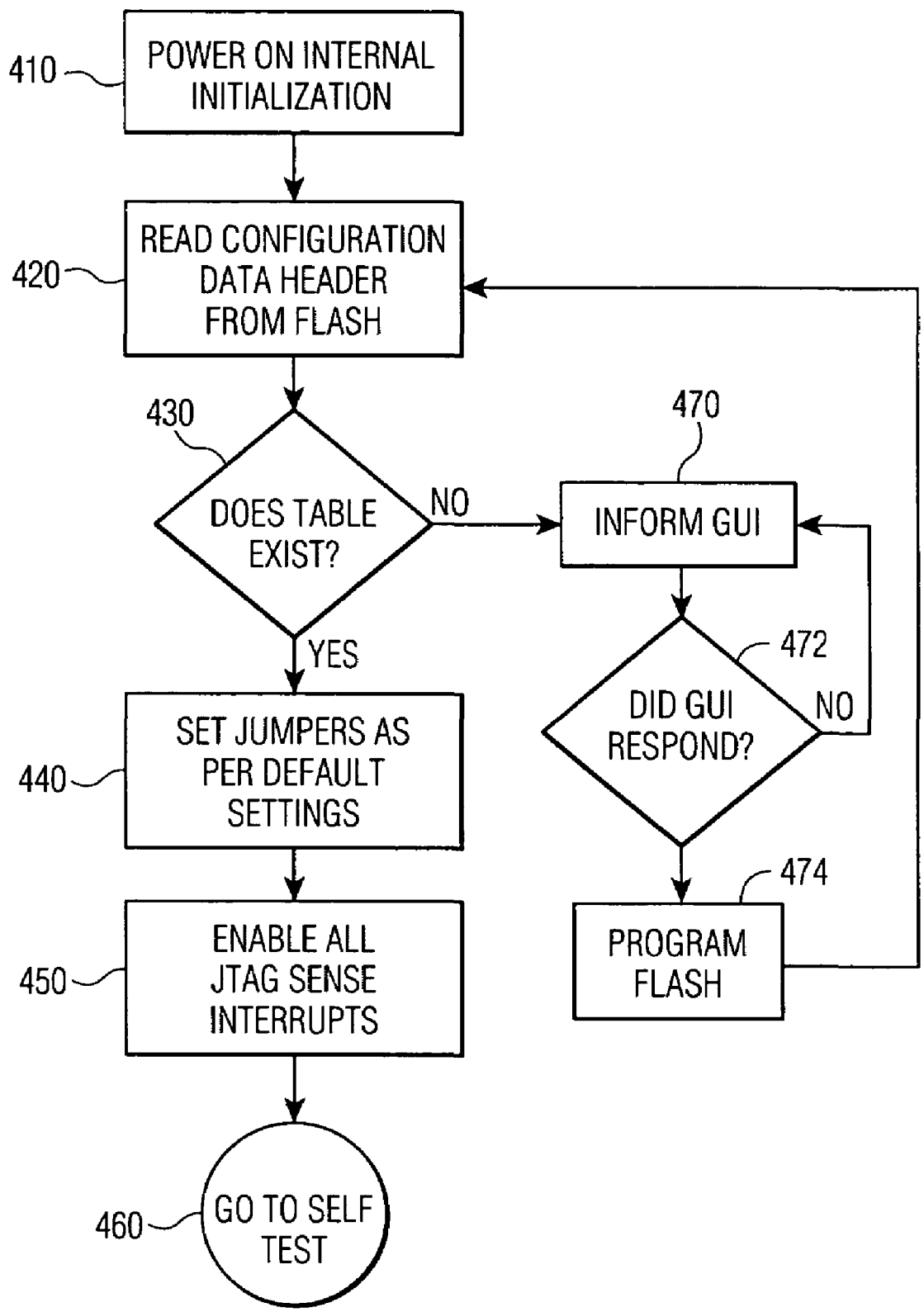
FIG. 4 is a flow diagram for a power-up step of a hardware configuration approach, according to another example embodiment of the present invention.

Referring to FIG. 4, a configurator server is powered for initialization, in connection with another example embodiment of the present invention. At block 410, an internal initialization is carried out for a configurator server arrangement. A configuration data header is read from FLASH (or other type) memory at block 420, and if a programming table (for use in controlling JTAG signals on the IC) does not exist at node 430, a graphic user interface (GUI) device is informed at block 470. If the GUI responds at node 472, the FLASH memory is programmed with the response at block 474 (e.g., using computer-executable code at the GUI, as discussed in connection with FIG. 1). If the GUI does not respond at node 472, the GUI is re-informed at block 470, with the process at block 470 and node 472 being repeated (e.g., at a selected time interval or with a continuous display at the GUI) until a response is received. After the FLASH is programmed, the process continues again at block 420. Once a table is found to exist at node 430, jumpers (e.g., JTAG signal path switches) are set at block 440, all JTAG sense inputs for detecting JTAG signals are enabled at block 450, and a self-test (FIG. 5) is begun at node 460.

Figure 5:
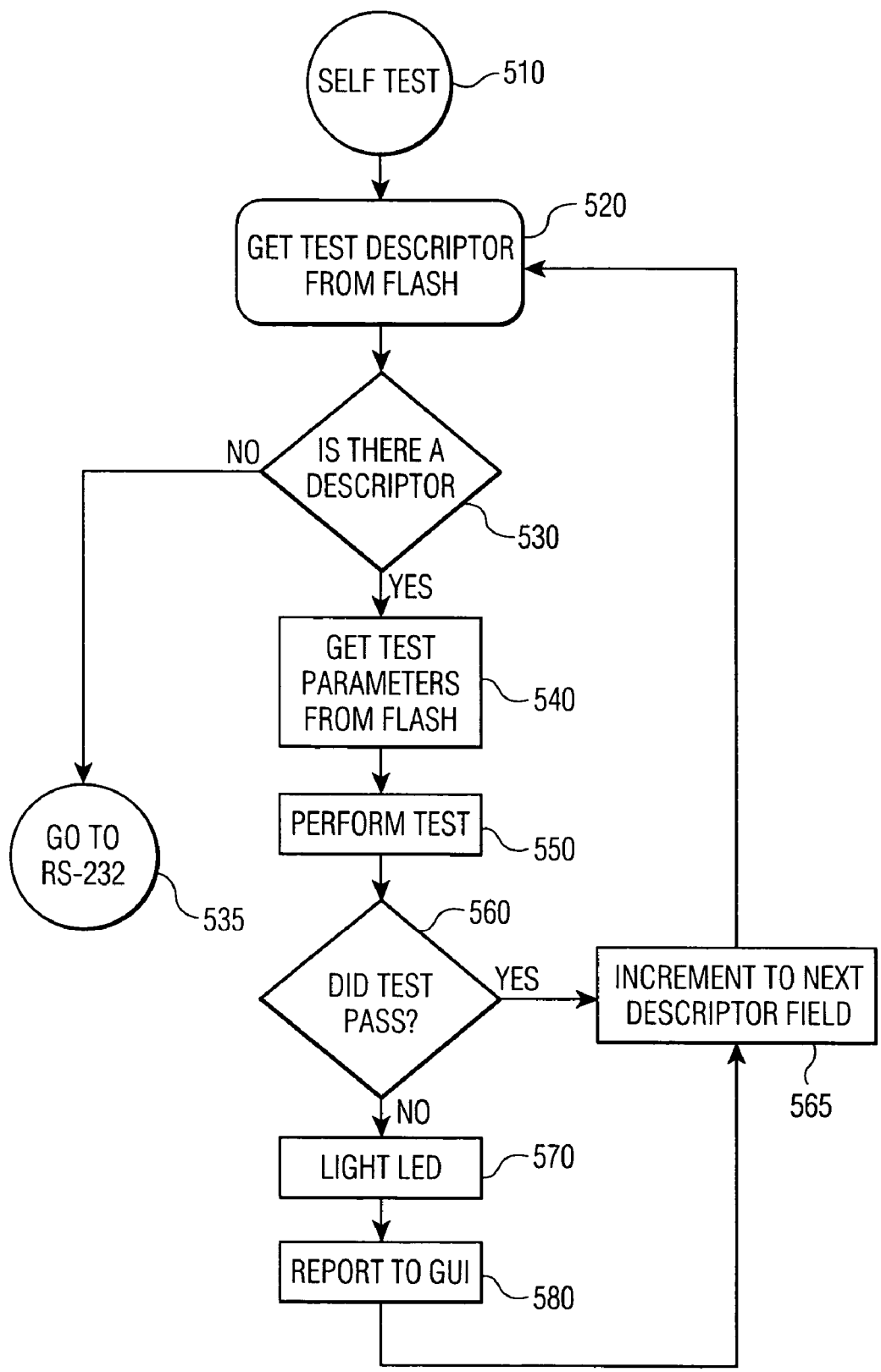
FIG. 5 is a flow diagram for a self-test step of a hardware configuration approach, according to another example embodiment of the present invention.

FIG. 5 shows a self-test approach, according to another example embodiment of the present invention. The self-test is initiated at node 510, with a test descriptor being obtained from FLASH memory at block 520. If a descriptor is not present at node 530, an RS-232 port (or other type of communications port) is queried at node 535, as discussed further in connection with FIG. 4 to obtain a descriptor. Once a descriptor is available, test parameters are retrieved from FLASH memory at block 540, and a test is performed at block 550 (e.g., a connectivity or clock frequency test). If the test fails at node 560, an LED is lit at block 570 and the GUI is informed at block 580. If the test passes at node 560, or after the GUI has been informed at block 580, an increment is made to a next descriptor field at block 565 (e.g., for performing additional tests), and the process continues at block 520 until tests in the FLASH have been performed. Referring again to FIG. 1, this approach can be implemented for testing the IC 110 using information stored at the memory 122 (e.g., implemented as the FLASH memory discussed above).

Figure 6:
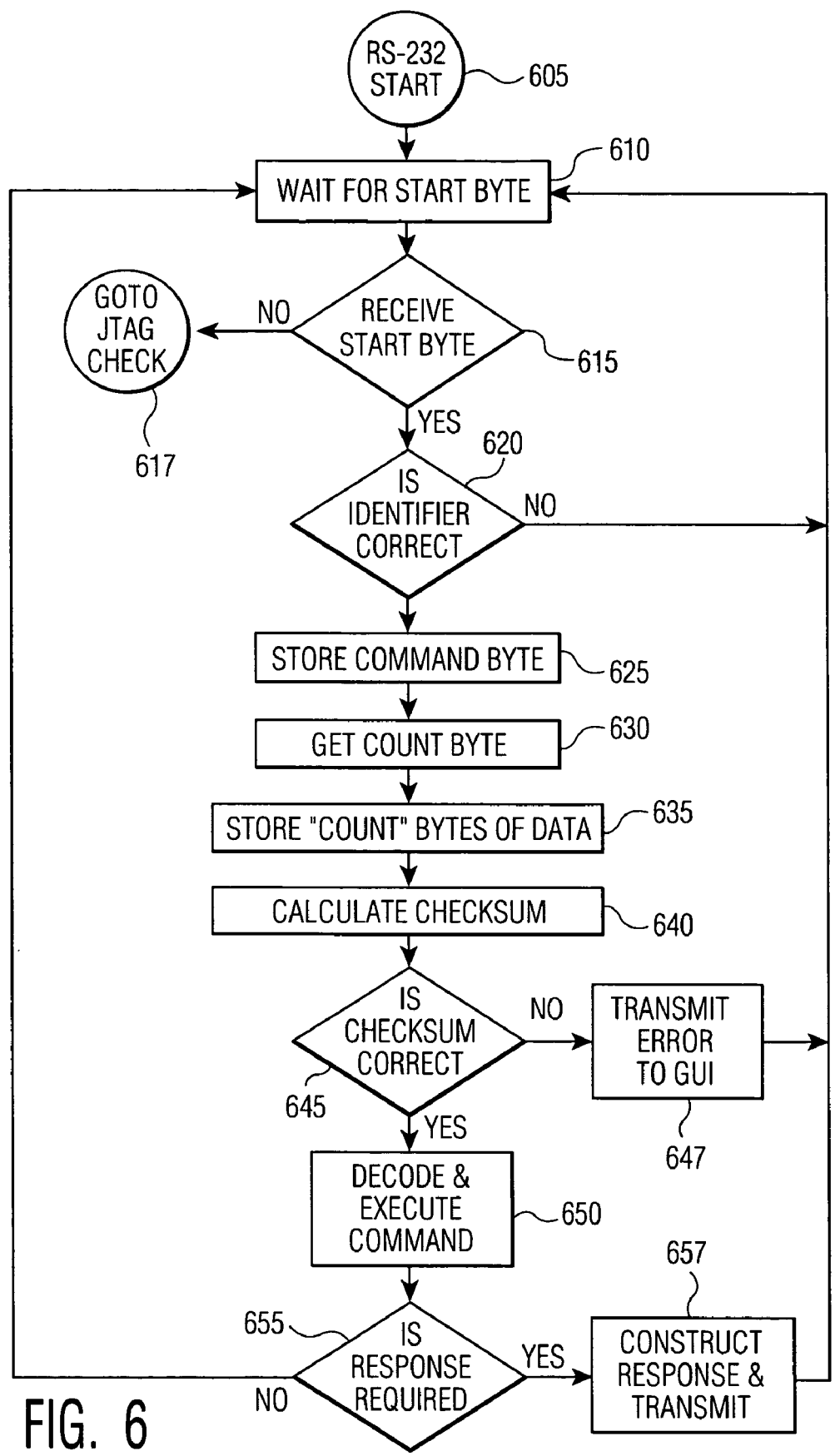
FIG. 6 is a flow diagram for a communications step of a hardware configuration approach, according to another example embodiment of the present invention.

FIG. 6 shows an approach for communicating with an RS-232 port at a JTAG hardware configurator, according to another example embodiment of the present invention. At node 605, RS-232 communications are started, with the process beginning by waiting for a start byte at block 610. If a start byte is not received at node 615, a JTAG signal check is performed at node 617 (e.g., in connection with FIG. 6, discussed below). When a start byte is received at block 615, an identifier is checked at node 620, and if incorrect, the process resumes at block 610. If the identifier is correct at node 620, a command byte received through the RS-232 port is stored at block 625, a count byte is accessed at node 630 and used for storing bytes of data at node 635 having a length set by the count byte. A checksum is calculated at block 640 to defect that the proper bytes have been received, and if the checksum is incorrect at node 645, an error is transmitted to the GUI at block 647, and the process resumes at node 610. If the checksum is correct at node 645, the command (bytes of data) is decoded and executed at node 650. If a response is required at node 655, a response is constructed and transmitted at node 657. The process then returns to node 610. With this approach, control signals from a remote GUI can be implemented for controlling a hardware configurator arrangement, such as the arrangement 100 in FIG. 1.

Figure 7:
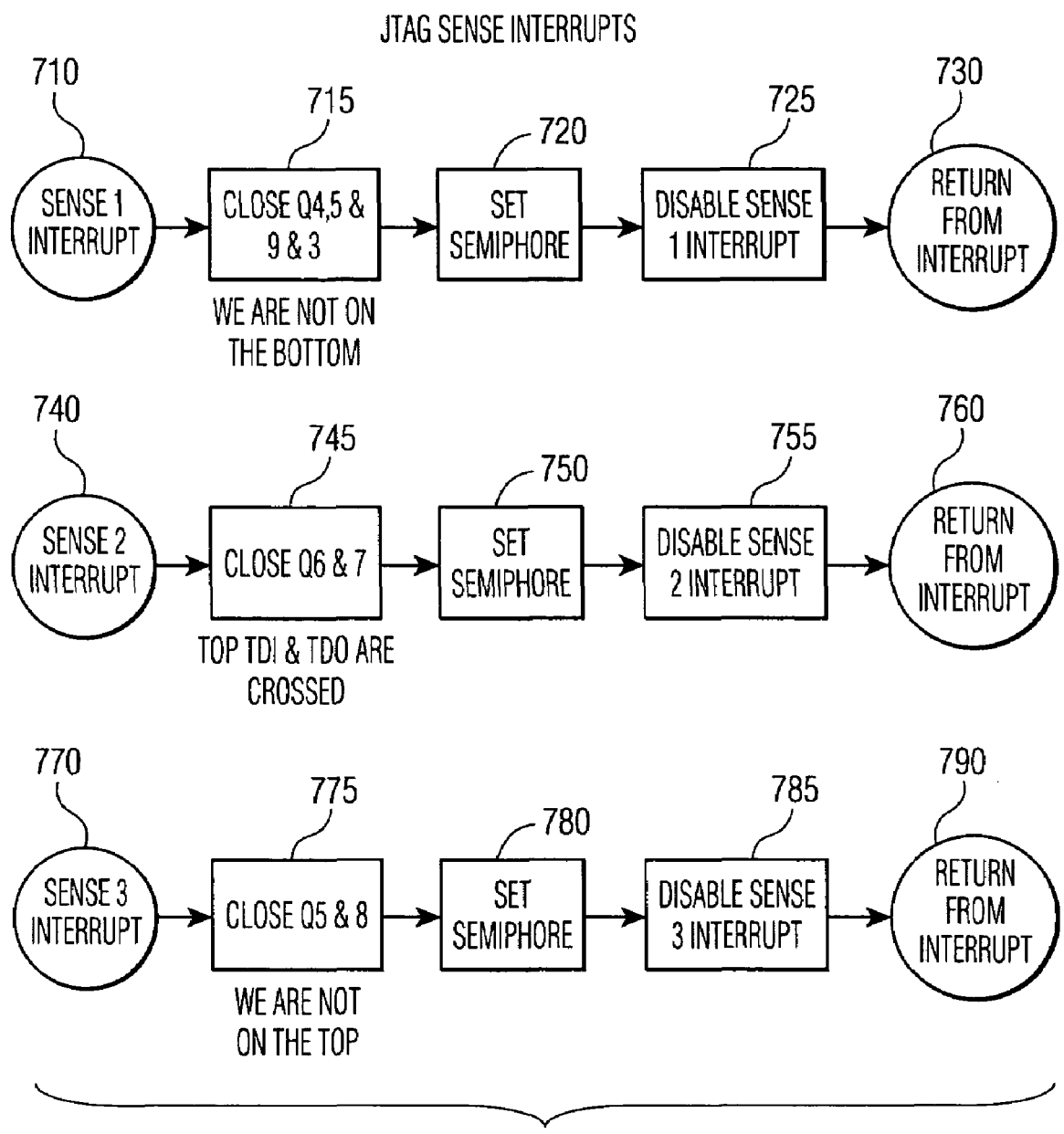
FIG. 7 is a flow diagram for a JTAG interactive configuration detection step of a hardware configuration approach, according to another example embodiment of the present invention.

FIG. 7 is an approach for detecting the position of a JTAG-compatible circuit, relative to other JTAG-compatible circuits coupled thereto in a stacked arrangement, according to another example embodiment of the present invention. This approach may, for example, be implemented in connection with the stackable prototype circuit shown in FIG. 3. By way of example, FIG. 7 is discussed in connection with the circuit shown in FIG. 3. At node 710, a first sense interrupt routine for test node 336 is begun, with switches 303, 304, 305 and 309 being closed at block 715 in response to no signal being detected at test node 336. At block 720, a first semiphore (e.g., a software flag or indicator light) is set, and a JTAG signal sense interrupt coupled to test node 332 is disabled at block 725, with the first sense interrupt routine ending at node 730.

At node 740, a second sense interrupt routine for test node 332 is begun, showing signals at test nodes 330 and 332 having been discovered as being crossed. At block 745, switches 306 and 307 are closed in response, a semiphore is set at block 750, a sense interrupt for test node 332 is disabled anti the second sense interrupt routine is ended at node 760.

At node 770, a third sense interrupt routine is initiated, where no test signals are detected from an upper JTAG-compatible circuit. At block 775, switches 305 and 308 are closed, a semiphore is set at block 780, a sense interrupt for test node 330 is disabled at block 785 and the interrupt routine ends at node 790.

Figure 8:
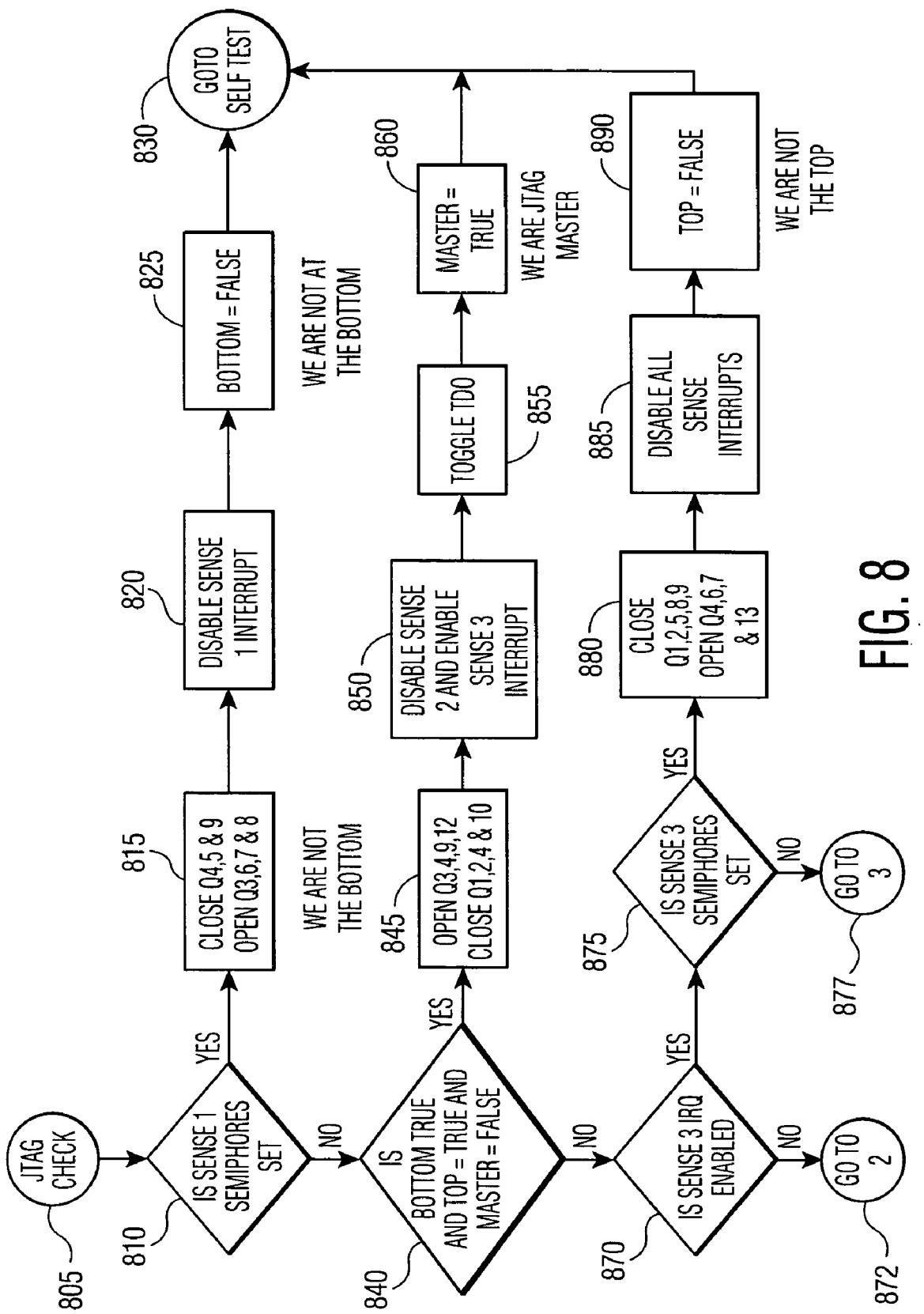
FIG. 8 is a flow diagram for a JTAG signal detection step of a hardware configuration approach, according to another example embodiment of the present invention.
Figure 9:
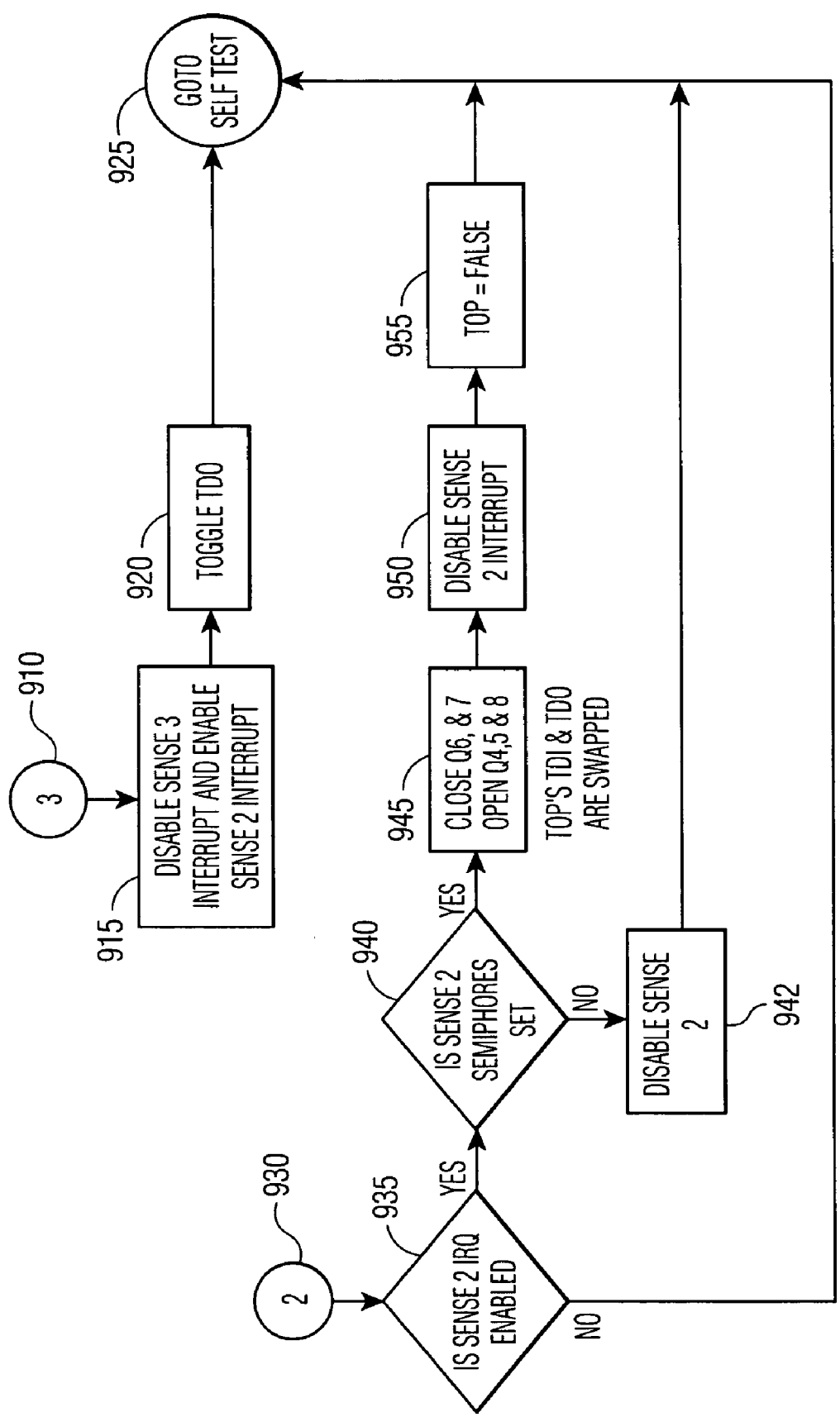
FIG. 9 is a flow diagram for a controlling switches and interrupt-detect signals for a configuration step of a hardware configuration approach, according to another example embodiment of the present invention.

FIGS. 8 and 9 show an approach for performing a JTAG signal check, according to another example embodiment of the present invention. The JTAG signal check approach may, for example, be performed in connection with the approach discussed in connection with node 417 in FIG. 4. In addition, the approaches in FIGS. 8 and 9 may also be implemented in connection with the interrupt routines discussed in connection with FIG. 7; by way of example, the approaches shown in FIGS. 8 and 9 are discussed in the context of the interrupt routines shown in FIG. 7.

At node 805, the JTAG signal check is initiated and, if the first semiphore is set, switches 304, 305 and 309 are closed, and switches 303, 306, 307 and 308 are opened at block 815. The sense interrupt for test node 336 is disabled at block 820, and an indicator of whether a JTAG-compatible circuit is coupled to test nodes 334 and 336 is set to FALSE (i.e., no JTAG-compatible circuit present) at block 825. A self-test is then initiated at node 830, for example, as discussed in connection with FIG. 5.

If the first semiphore is not set at node 810 the process proceeds to node 840, here shown detecting whether JTAG-compatible circuits are coupled above and below the circuit being tested, and whether the circuit being tested is a master circuit (i.e., controls JTAG signal passing on all three circuits). If the circuit being tested is not the master and is coupled to JTAG-compatible circuits above and below, the process proceeds to block 845. This determination is made at node 840 using, for example, indicators such as that set in block 825, after detecting the presence of additional JTAG-compatible circuits at test nodes 330 and 332, or at test nodes 334 and 336. At node 845, switches 303, 304, 309 and 312 are opened, and switches 301, 302, 304 and 310 are closed. A sense interrupt for test nodes 330 and 332 are disabled, test data out (TDO) signals are toggled at node 855 and an indicator that the circuit being tested is the master is set to TRUE at block 860. A self-test is then initiated at node 830.

If the three conditions set out at node 840 are not met, a determination is made at node 870 as to whether a sense interrupt for test node 330 is enabled. If the sense interrupt for test node 330 is not enabled, the process proceeds to scenario 2 at node 872, shown in FIG. 9 and discussed below. If the sense interrupt for test node 330 is enabled at node 870 and the semiphore for the sense interrupt for test node 330 is not set, the process proceeds to scenario 3 at node 877, shown in FIG. 9 and discussed below. If the sense interrupt for test node 330 is enabled at node 870 and the semiphore for the sense interrupt for test node 330 is set, the process proceeds to block 880, where switches 301, 302, 305, 308 and 309 are closed, and switches 304, 306, 307 and 313 are opened. At block 885, all sense interrupts are disabled, an indicator that the circuit being tested is not the top JTAG-compatible circuit is set to false at block 890 and a self-test is initiated at node 830.

FIG. 9 shows implementations of scenarios 2 and 3 as discussed above in connection with FIG. 8. Scenario 2 is initiated at node 930. If the sense interrupt for test node 332 is not enabled at node 935, the process proceeds to a self test at node 925. If the sense interrupt for test node 332 is enabled at node 935 but a semiphore therefor is not set at node 940, the sense interrupt for test node 332 is disabled at block 942. The process then proceeds to a self test at node 925 (e.g., in connection with FIG. 3). If the sense interrupt for test node 332 is enabled and the semiphore therefor is set, switches 306 and 307 are closed and switches 304, 305 and 308 are opened at block 945 (i.e., to swap signals at test nodes 330 and 332). The sense interrupt for test node 332 is disabled at block 950, an indicator that the circuit being tested is not the top JTAG-compatible circuit is set to false at block 955, and a self-test is initiated at node 925.

Referring again to FIG. 9, scenario 3 is initiated at node 910, with the sense interrupt for test node 330 being disabled and the sense interrupt for test node 332 being enabled at block 915. Test data out (TDO) signals are triggered at block 920, and a self test is initiated at node 925.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, as can be seen by the variety of switches 301–314 in FIG. 3, a plurality of combinations of open and closed switches can be used for routing data on the circuit 300 and to other circuits coupled to the circuit 300. Furthermore, one or more of the example embodiments discussed herein may be implemented in connection with the subject matter discussed in U.S. Provisional Patent Application Ser. No. 60/459,295 (US030078), entitled "Configurator Arrangement and Approach Therefor" and in U.S. Provisional Patent Application Ser. No. 60/459,327 (US030080), entitled "Circuit Configurator Arrangement and Approach Therefor," both of which are filed concurrently herewith and fully incorporated herein by reference. These approaches are implemented in connection with various example embodiments of the present invention.

Such modifications and changes do not depart from the true spirit and scope of the present invention that is set forth in the following claims.

What is claimed is:

1. For use with a programmable microcontroller (140) for controlling routing circuitry (160) having configurable test signal routing paths with controllable switches therein for coupling test signals between dedicated test-signal circuitry and a target circuit device, a graphical user interface terminal (100) comprising:
   a micro-computer circuit (105);
   an input/output (I/O) interface circuit (130) coupled to the microcontroller; and
   stored computer-executable code (107) that, when executed, causes the micro-computer circuit to:
      in response to a user input, send configuration data to the microcontroller via the I/O interface circuit for automatically configuring the microcontroller to control the controllable switches for selectively routing the test signals between the dedicated test signal circuitry and the target circuit device;
      receive characteristics of the routing circuitry from the microcontroller via the I/O interface circuit; and
      display the received characteristics.

2. The graphical user interface terminal of claim 1, wherein the stored computer-executable code, when executed in response to user control inputs, causes the micro-computer circuit to send configuration data to the microcontroller for actively controlling the routing of test signals between the dedicated test signal circuitry and the target circuit device.

3. The graphical user interface terminal of claim 1, wherein the stored computer-executable code, when executed in response to user programming inputs, causes the micro-computer circuit to send configuration data to the microcontroller for storage in memory at the microcontroller for use in programming the microcontroller to configure the controllable switches.

4. The graphical user interface terminal of claim 1, further comprising a user input device adapted to receive user inputs for executing the stored computer-executable code.

5. The graphical user interface terminal of claim 1, wherein the stored computer-executable code, when executed, causes the micro-computer circuit to send control inputs to the microcontroller for performing diagnostic tests on the configurable test signal routing paths.

6. The graphical user interface terminal of claim 1, wherein the stored computer-executable code, when executed, causes the micro-computer circuit to send control inputs to the microcontroller for detecting characteristics of the routing circuitry and for sending detected characteristics of the routing circuitry back to the graphical user interface terminal via the I/O interface circuit for display at the graphical user interface terminal.

7. The graphical user interface terminal of claim 1, further comprising a personal computer including the micro-computer circuit, the I/O interface, a memory including the stored computer-executable code, an input device adapted to receive user inputs for executing the stored computer-executable code and an output device adapted to display the received characteristics.

8. The graphical user interface terminal of claim 7, wherein the personal computer is adapted to control the microcontroller for at least one of: monitoring operational characteristics, performing diagnostics, controlling JTAG operations and controlling jumper switches on the configurable test signal routing paths.

9. The graphical user interface terminal of claim 7, wherein the personal computer has a plurality of I/O ports and wherein the stored computer-executable code, when executed, causes the micro-computer circuit to configure one of the plurality of I/O ports for use as the I/O interface circuit.

10. The graphical user interface terminal of claim 1, wherein the I/O interface circuit is coupled to a plurality of microcontrollers and wherein the stored computer-executable code, when executed, causes the micro-computer circuit to send configuration data to select ones of the plurality of microcontrollers.

11. The graphical user interface terminal of claim 1, wherein the stored computer-executable code, when executed, causes the micro-computer circuit to send configuration data to the microcontroller for executing interrupt routines for sensing the presence of another circuit device coupled to the routing circuitry and, in response to sensing the presence of another circuit device, for controlling the controllable switches to route test signals between the configurable test signal routing paths and said another circuit device.

12. The graphical user interface terminal of claim 1, wherein the stored computer-executable code, when executed in response to user inputs, causes the micro-computer circuit to send configuration data to the microcontroller for controlling the controllable switches to route a selected clock signal to a selected one of the target circuit devices.

13. The graphical user interface terminal of claim 1, wherein the stored computer-executable code, when executed, causes the micro-computer circuit to send configuration data to the microcontroller for testing at least one characteristic of the routing circuitry, prior to coupling test signals between dedicated test-signal circuitry and a target circuit device.

14. The graphical user interface terminal of claim 13, wherein the stored computer-executable code, when executed, causes the micro-computer circuit to send configuration data to the microcontroller for detecting a connectivity characteristic of the routing circuitry, prior to coupling test signals between dedicated test-signal circuitry and a target circuit device.

15. The graphical user interface terminal of claim 1, wherein the stored computer-executable code includes initialization code that, when executed upon power-up of the micro-computer circuit, causes the micro-computer circuit to send configuration data to the microcontroller via the I/O interface circuit, the configuration data including values from the initialization code.

16. The graphical user interface terminal of claim 1, wherein the stored computer-executable code, when executed, causes the micro-computer circuit to download an initialization file to the microcontroller for configuring the microcontroller during power-up thereof.

17. The graphical user interface terminal of claim 1, wherein the stored computer-executable code, when executed, causes the microcomputer circuit to send configuration data including emulation data to the microcontroller via the I/O interface circuit for emulation at the microcontroller.

18. For use with a programmable microcontroller (140) for controlling routing circuitry (160) having configurable test signal routing paths with controllable switches therein for coupling test signals between dedicated test-signal circuitry and a target circuit device, memory storage media (107) containing computer-executable code for execution by a computer (105), such that upon execution by the computer, the computer-executable code causes the computer to:

in response to a user input, send configuration data to the microcontroller for automatically configuring the microcontroller to control the controllable switches for selectively routing the test signals between the dedicated test signal circuitry and the target circuit device;

receive characteristics of the routing circuitry from the microcontroller; and display the received characteristics.

19. The memory storage media of claim 18, wherein upon execution by the computer, the computer-executable code causes the computer to send control signals to the microcontroller for actively configuring the configurable test signal routing paths.

20. The memory storage media of claim 18, wherein upon execution by the computer, the computer-executable code causes the computer to send control signals to the microcontroller for actively detecting characteristics of the routing circuitry and for sending the detected characteristics to the computer.

21. The memory storage media of claim 18, wherein upon execution by the computer, the computer-executable code causes the computer to send program code to the microcontroller for storage at the microcontroller, the program code being adapted, when executed, to cause the microcontroller to configure the configurable test signal routing paths.

22. The memory storage media of claim 18, wherein upon execution by the computer, the computer-executable code causes the computer to send program code to the microcontroller for storage at the microcontroller, the program code being adapted, when executed, to cause the microcontroller to detect characteristics of the routing circuitry and send the detected characteristics to the computer.

23. For use in a prototype arrangement of inter-connectable circuit boards, a graphical user interface system comprising:

a plurality of inter-connectable circuit boards having a programmable microcontroller (340) for controlling routing circuitry having configurable test signal routing paths with test nodes (330, 332) and controllable switches (306, 308) therein for coupling test signals between the inter-connectable circuit boards; and a graphical user interface terminal comprising:

a micro-computer circuit (105);

an input/output (I/O) interface circuit (130) coupled to the microcontroller; and stored computer-executable code (107) that, when executed, causes the micro-computer circuit to:

in response to a user input, send configuration data to the microcontroller via the I/O interface circuit for automatically configuring the microcontroller to control the controllable switches for selectively routing the test signals between the inter-connectable circuit boards via the test nodes in response to a signal detected from at least one of the test nodes;

receive characteristics of the routing circuitry from the microcontroller via the I/O interface circuit; and display the received characteristics.

24. The system of claim 23, wherein the stored computer-executable code, when executed, causes the micro-computer circuit to send configuration data to the microcontroller for switching the controllable switches in response to control inputs received at the graphical user interface terminal.

25. The system of claim 23, wherein the stored computer-executable code, when executed, causes the micro-computer circuit to send configuration data to the microcontroller for programming the microcontroller to perform an interrupt routine for detecting a signal from the at least one of the plurality of test nodes and, in response to detecting a signal, to switch the controllable switches for routing test signals between the inter-connectable circuit boards.

* * * * *